3,824,121
PRODUCTION OF SILICON METAL FROM DICHLOROSILANE

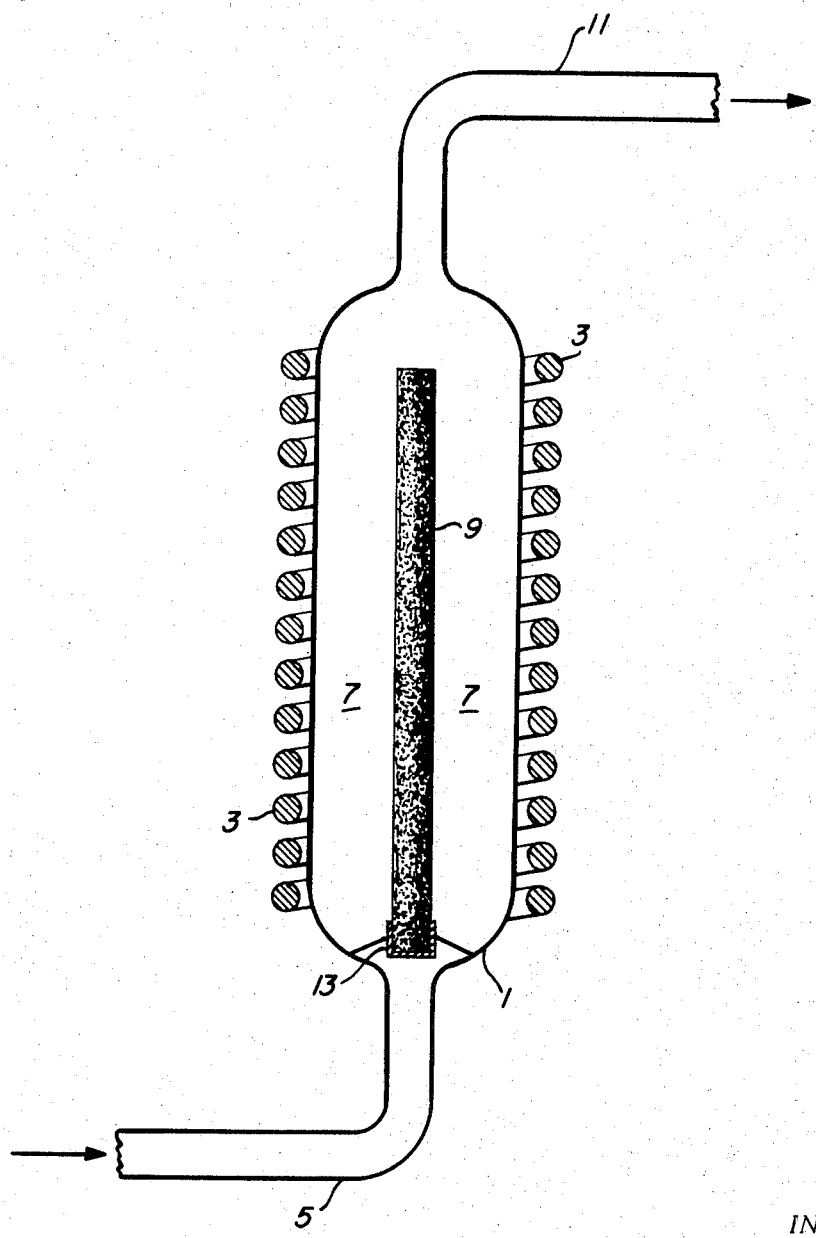

Howard B. Bradley, St. Marys, W. Va., and Maurice H. Jellinek, Stamford, Conn., assignors to Union Carbide Corporation, New York, N.Y.
Continuation of application Ser. No. 80,645, Oct. 14, 1970, which is a continuation-in-part of applications Ser. No. 874,444 and Ser. No. 874,445, both Nov. 6, 1969, all now abandoned. This application Aug. 21, 1972, Ser. No. 282,107
Int. Cl. C23c 11/00
U.S. Cl. 117—106 A
7 Claims

ABSTRACT OF THE DISCLOSURE

The process of producing silicon metal from a chlorosilane whereby to obtain improved yields and rates of production of silicon metal, based on the amount of silicon in the chlorosilane used to produce the silicon metal, which comprises providing dichlorosilane gas in admixture with hydrogen gas in a reaction zone having a temperature sufficient to effect the reduction and decomposition of said dichlorosilane to silicon metal and maintaining the temperature at which said reaction is effected and the residence time of said dichlorosilane in said reaction zone sufficient to provide yields of silicon metal of at least 50 percent. In addition, this process provides a substantial reduction in the amount of by-product $SiCl_4$ as compared with silicon metal making processes which employ trichlorosilane as the silicon source.

---

This is a continuation of application Ser. No. 80,645 filed Oct. 14, 1970, now abandoned. Application Ser. No. 80,645 is a continuation-in-part of copending applications, Ser. Nos. 874,444 and 874,445, both filed Nov. 6, 1969, both abandoned.

SUMMARY OF THE INVENTION

This invention relates to producing extremely high yields and rates of production of silicon metal from a chlorosilane by the reduction and decomposition of same. More particularly, this invention is concerned with decomposition and reduction of dichlorosilane such that 50 percent thereof, basis weight of silicon in dichlorosilane, is converted to silicon metal of the polycrystalline or epitaxial variety.

BACKGROUND OF INVENTION

Polycrystalline and epitaxial silicon metals employed in semi-conductor usage are typically produced by the reduction and decomposition of silicon tetrachloride, trichlorosilane and/or silane. These silicon containing compounds are typically mixed with large concentrations of hydrogen gas and reacted at activation temperatures sufficient to effect reduction and decomposition whereby to deposit silicon metal by such reaction on predetermined substrates. In the case of polycrystalline metal, essentially all of such is produced by the reduction of trichlorosilane. Initially, the art employed in commercial operations silicon tetrachloride as the starting material. However, the rate of production, the efficiencies in and yields effected by decomposition and reduction of $SiCl_4$ were exceptionally poor. The art investigated the use of trichlorosilane instead, and found that trichlorosilane provided many advantages over silicon tetrachloride. Firstly, one could obtain higher yields of silicon metal from trichlorosilane. Secondly, it was found that trichlorosilane decomposed and reduced at higher rates, better yields and at significantly lower temperatures. Though trichlorosilane is substantially more volatile than silicon tetrachloride and more susceptible to explosive reactions, its stability is sufficient to allow its ready usage in the manufacture of silicon metal with substantial safety. Presently, little usage of silane in the manufacture of polycrystalline silicon metal has been effected commercially, though substantial interest in the use of silane for making epitaxial silicon materials appears to be developing.

Generally speaking, the best yields that one can obtain in terms of silicon starting materials converted to silicon metal, basis weight of silicon therein, is on the order of about 40 percent. For example, even after substantial recycling of trichlorosilane and the by-products formed in the reaction of trichlorosilane in its conversion to silicon metal, about 40 percent of the trichlorosilane, basis weight of silicon therein, at best can be converted to silicon metal. Usually, the maximum yields obtainable are on the order of about 37 percent. On a single pass basis, that is passing the trichlorosilane through hot reaction zone in the presence of the deposition surface in admixture with hydrogen gas, the best yields obtainable are on the order of 15 to 27 percent. Lower yields are obtained when silicon tetrachloride is the starting material. There are little in the way of reported results on the reduction of silane, though the yields obtained appear to be comparable to those obtained in the reduction of trichlorosilane when employing standard procedures. One problem with decomposition of $SiH_4$, the silicon metal obtained on a standard reactor appears to vary greatly in quality throughout the reactor.

As indicated previously, the conversion of trichlorosilane to silicon metal is effected in the presence of a substantial quantity of hydrogen gas. It is generally believed that the hydrogen gas is a necessary reactant in order to effect total conversion of trichlorosilane into silicon metal by sequestering the chlorine by-product produced as HCl. In the usual practice, the excess of hydrogen gas, determined on a mole basis, typically is at least about 20 times that of the silicon starting material such as trichlorosilane and silicon tetrachloride. Needless to say, the more hydrogen that is required in effecting the reaction, the more expensive is the reaction. For example, with each mol increase of gas, either one increases the velocity of the reaction in terms of gas flow through the reactor or one increases the size of the reactor. In any event either situation results in higher cost since increased velocity requires greater recycle facilities and greater pumping capacity. In the case of the large reactor, one is faced with increased capital expense necessary to build such a larger reactor. What particularly compounds this problem is the fact that the silicon starting material has to be extremely pure containing fractional parts per billion of undesirable impurities. This also means that the hydrogen gas must be extremely pure. Such pure hydrogen is exceedingly more expensive than the garden variety commercial hydrogen gas available in the open market.

It has been generally believed that the productivity obtainable from any one of these silanes ranging from silane per se to silicon tetrachloride would be essentially the same and that the only difference that one might see would be a reduction in the temperature at which decomposition is effected. It is generally well recognized that silicon tetrachloride requires higher temperatures to activate its decomposition whereas silane requires possibly the least amount of heat to effect its decomposition. It has been postulated that trichlorosilane, dichlorosilane and monochlorosilane fit in between, reducing in activation temperature by the reduction in the amount of chlorine attached to silicon. In any event, there is nothing indicated in the art in that by the interchangeability of any one of the silanes for any other that the overall yield obtained in terms of conversion of the starting material to silicon metal would be essentially any different. In this regard, note U.S. Patents, Nos. 3,021,198; 3,099,534; 3,120,451; 3,168,422; 3,200,001; 3,341,359; and 3,286,685.

ADVANTAGES OF INVENTION

It has now been found that for the first time one can obtain yields of silicon metal in excess of 50 percent, basis weight of silicon in the starting material, in a single pass. Indeed, it is possible to obtain yields ranging as high as 95 percent, and potentially even higher than that. Such yields became possible only as a result of a breakthrough in the theoretical concepts underlying the production of silicon metal from the aforementioned silicon starting materials. This breakthrough in the theoretical considerations of the production of silicon metal brought forth the remarkable discovery that dichlorosilane when heated at an activation temperature sufficient to effect its decomposition can be converted to silicon metal in the aforementioned remarkably high yields. And these yields are obtainable in a single pass as compared to yields in the order of 27 percent that one can obtain in a single pass reduction of trichlorosilane. Because of these extremely high yields and the lower activation temperatures necessary to effect the aforementioned reduction of dichlorosilane, it is now possible to more than double the production of silicon metal from the same reactors employed commercially for making silicon metal from trichlorosilane with substantial savings in the elimination of recycle, equipment necessary to effect recycle, storage facilities, unwanted by-products such as large quantities of silicon tetrachloride.

The conversion of trichlorosilane to silicon metal has generally been accepted to proceed in accordance with the following equation:

I  $HSiCl_3 + H_2 \rightarrow Si + 3HCl$

In a similar fashion, silicon tetrachloride is believed to reduce to silicon metal in accordance with the following equation:

II  $SiCl_4 + 2H_2 \rightarrow Si + 4HCl$

The significant discovery mentioned above with respect to the prior art procedures was determining that the theoretical conversion of trichlorosilane to silicon metal proceeded in the following manner:

III
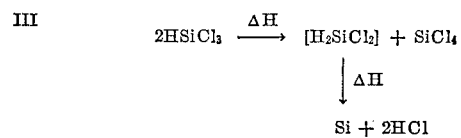

$$2HSiCl_3 \xrightarrow{\Delta H} [H_2SiCl_2] + SiCl_4$$
$$\downarrow \Delta H$$
$$Si + 2HCl$$

As noted from equation III, instead of the decomposition of trichlorosilane directly to silicon metal, it was determined that the theoretical reaction instead produces an extremely transitory dichlorosilane which, under reaction conditions, produces silicon metal without producing $SiCl_4$. Note that in equation I, the art fails to show the formation of silicon tetrachloride. Apparently, the art assumes that its formation during the reaction results from the reaction of by-product HCl with silicon deposited as silicon metal. Even if one could have envisioned the existence of transitory dichlorosilane it would be more reasonable to presume, based on the prior art, the equivalent production of silicon metal and silicon tetrachloride from its decomposition. However, it has been found that dichlorosilane under ideal conditions of decomposition forms only silicon metal and hydrogen chloride and it is this latter product which reacts with silicon metal product in the reaction zone to produce $HSiCl_3$ which subsequently produce $SiCl_4$. If the length of time in the reaction zone of any molecule of $H_2SiCl_2$ is kept low enough, the yield of Si metal produced can exceed 50%, preferably exceed about 60%, basis weight of Si in $H_2SiCl_2$ fed to the reaction zone.

In this respect, it should be appreciated that if one were to provide extremely low concentrations of dichlorosilane in the reaction zone and provide long residence times, that is, employ a residence time which allows for significant attack of the deposited silicon by hydrogen chloride, the exceptional high yields defined above would be lost by conversion of the metal to trichlorosilane which thereafter disproportionates to form silicon metal and silicon tetrachloride. Such procedures would produce an undesirably larger amount of $SiCl_4$ which it is believed interferes at the substrate surface with metal deposition. For this reason, the residence time should be short enough to provide the aforementioned high yields of silicon metal and a $SiCl_4$ by-product yield below 50 mole percent, basis moles of dichlorosilane employed in making the silicon metal. Accordingly, this invention further contemplates the aforementioned low production of $SiCl_4$, preferably less than about 40 mole percent, from the production of silicon metal by the decomposition of $H_2SiCl_2$.

In the most preferred practice of this invention, the amount of dichlorosilane provided in the reaction zone and the residence time of the dichlorosilane in the reaction zone is controlled to provide that less than 45 mole percent of the silicon atoms of the $H_2SiCl_2$ provided in the reaction zone is converted to products other than silicon metal.

A further advantage of this invention, in addition to higher yields, is the ability to produce high quality silicon metal at higher conversion rates. Dichlorosilane has a significant advantage over trichlorosilane in its higher rate of reactivity. In a reasonably sized reactor such as is conventionally employed today to effect the reduction and decomposition of trichlorosilane to silicon metal, the reaction rate does not overall improve such conversion. The factor which does control to a significant degree the conversion rate is the concentration that one may employ of the chlorosilane in the hydrogen gas. As stated previously, the prior art typically employs at least twenty time the mole quantity of hydrogen to trichlorosilane, i.e., not more than about 5 mole percent trichlorosilane basis the total moles of gas introduced to the reaction zone. The remaining 95 mole percent is extremely pure hydrogen gas.

It has been determined that when more than 5 mole percent of $HSiCl_3$ is employed, that the productivity of the reaction is not improved, that is, the amount of silicon metal produced is not greater than the amount obtainable when there is employed 5 mole percent of $HSiCl_3$.

The great percentage of the volume of hydrogen gas though necessary to make good quality silicon metal, is used as a carrier which may or may not serve a useful function in the reduction reaction. Although the art does not foster the concept of replacing any of the hydrogen gas with other inert gases such as nitrogen and argon, it is believed theoretically impossible that all of the hydrogen employed serves usefully in the reduction of trichlorosilane. It is more likely that the low concentration of trichlorosilane allowable in the gas feed to the reaction zone is controlled by the peculiarities by which trichlorosilane reduces under the kinetics established by the conditions of the reaction. If one were able to reduce the concentration of hydrogen in the gas feed with trichlorosilane and obtain the same results, substantial savings would accrue, particularly if the extra amount of trichlorosilane employed were to be converted to silicon metal. However, in the case of trichlorosilane, this does not appear feasible.

In the practice of the present invention, it is possible to carry out the effective reduction and decomposition of dichlorosilane on the substrate surface wherein the mole concentration of dichlorosilane in the hydrogen gas feed constitutes more than 5 percent, preferably at least 6 percent, and typically not more than about 30 percent. In the preferred embodiment, the amount of dichlorosilane present in the gas mixture introduced to the reaction zone, constitutes at least about 6 mole percent up to about 25 mole percent. Moreover, it has been determined that substantial of the hydrogen gas in the feed can be replaced by inert gases such as nitrogen and argon, typically up to 30 mole percent of the gases fed to the reaction zone.

The benefits of such large concentrations of $H_2SiCl_2$ in the reaction zone are enormous in that such allows production of more than double the amount of silicon metal in a given period of time as compared to employing concentrations of not greater than 5 mole percent. Moreover, when compared to commercial production of Si metal from trichlorosilane, such higher concentrations of $H_2SiCl_2$ in the reaction zone achieves productivities of metal which are up to ten (10) times greater, or more, than is presently obtainable in such commercial operations. Such benefits have never been remotely conceivable from methods heretofore employed.

As stated previously, the reduction and decomposition of dichlorosilane in admixture with the gases, most of which is hydrogen gas, can be effected at the temperature at which the dichlorosilane starts to decompose into silicon metal up to the temperature at which the metal product produced is softened. Typically, the reaction temperature may range as low as about 750° C. to as high as about 1400° C., though usually temperatures of at least about 850° C. to about 1300° C. are more favorable. Preferably, the temperature which the decomposition and reduction reaction is most effective is about 900° C. up to about 1250° C.

In order to more specifically describe the process of this invention, reference is made to the drawing which illustrates a reactor in which the experiments set forth in the Table below were effected. In the drawing, reactor 1 is a quartz glass cylinder with tapered ends terminating into feed tube 5 and exit tube 11. The cylindrical length of reactor 1 is 30 centimeters and its inside diameter is 4 centimeters. Circumscribing the cylindrical portion of reactor 1 is an induction coil 3 connected to a 5 kw. high frequency induction heating unit. Inserted along the central axis of the interior of reactor 1 is a thin graphite rod 9 having a 0.6 centimeter diameter upon which was deposited the silicon metal during use of reactor 1. Rod 9 is held in position by rod holder 13. The rod temperature was measured by a pyromicro-optical pyrometer. Rod 9 can be made of any of the usable silicon depositing materials such as silicon, tantalum, quartz, and the like.

During use, reactor 1 was heated by induction coil 3 to cause rod 9 to be brought to the temperatures indicated in the Table below. The dichlorosilane and hydrogen feed gases were mixed from separate cylinders prior to introduction into feed tube 5. The off gases of the reaction were collected from tube 11 in a condenser system whereby the measurements indicated in the Table below were obtained.

The following Table records a series of experiments indicating a variety of dwell or residence times, hydrogen gas flow, concentration of dichlorosilane feed, the percent conversion of dichlorosilane, the amount of silicon lost as dichlorosilane (indicating unconverted dichlorosilane), the amount of silicon lost in the form of trichlorosilane (indicating a reaction of hydrogen chloride with silicon metal), and the amount of silicon metal lost as silicon tetrachloride. In the last two columns of the Table are the yields of silicon metal and rod 9 temperature in ° C. for each of the experiments.

TABLE

| $H_2$ flow, ml./min. | Dwell time, mins. | Moles per minute $H_2SiCl_2$ feed | Percent | | | | Si metal yield | Reactor temp., ° C. (Rod 9) |
|---|---|---|---|---|---|---|---|---|
| | | | $H_2SiCl_2$ conversion | Si lost as $H_2SiCl_2$ | Si lost as $HSiCl_3$ | Si lost as $SiCl_4$ | | |
| 73 | 5 | 7.4 | 97.5 | 2.5 | 5.4 | 29.3 | 62.8 | 980 |
| | 5 | 9.3 | 96.5 | 3.5 | 8.7 | 25.8 | 62.0 | 1,050 |
| | 5 | 11.6 | 97.5 | 2.5 | 4.1 | 27.6 | 65.8 | 1,160 |
| | 5 | 14.3 | 98.8 | 1.2 | 4.9 | 44.8 | 49.1 | 1,250 |
| 140 | 2.64 | 4.9 | 97.8 | 2.2 | 8.2 | 33.9 | 55.7 | 980 |
| | 2.64 | 6.4 | 96.8 | 3.2 | 12.5 | 24.0 | 60.3 | 1,050 |
| | 2.64 | 6.5 | 99.3 | 0.7 | 3.1 | 21.5 | 74.3 | 1,160 |
| | 2.64 | 6.8 | 98.5 | 1.5 | 7.4 | 33.8 | 57.3 | 1,250 |
| 300 | 1.23 | 4.2 | 97.6 | 2.4 | 11.7 | 23.8 | 62.1 | 980 |
| | 1.23 | 3.5 | 97.5 | 2.5 | 18.3 | 9.4 | 69.8 | 1,050 |
| | 1.23 | 4.0 | 99.7 | 0.3 | 2.5 | 17.0 | 80.2 | 1,160 |
| | 1.23 | 5.3 | 98.8 | 1.2 | 5.7 | 17.7 | 75.4 | 1,250 |
| 600 | 0.62 | 3.0 | 96.8 | 3.2 | 26.6 | 13.5 | 56.7 | 980 |
| | 0.62 | 1.67 | 98.5 | 1.5 | 18.0 | 8.4 | 72.1 | 1,050 |
| | 0.62 | 1.24 | 98.6 | 1.4 | 24.2 | 4.0 | 70.4 | 1,160 |
| | 0.62 | 2.6 | 98.6 | 1.4 | 15.4 | 15.4 | 67.8 | 1,250 |
| 1,000 | 0.37 | 1.94 | 88.5 | 11.5 | 27.3 | 3.6 | 57.6 | 980 |
| | 0.37 | 1.97 | 98.0 | 2.0 | 25.9 | 7.5 | 64.6 | 1,050 |
| | 0.37 | 1.15 | 99.4 | 0.6 | 13.9 | 2.5 | 83.0 | 1,160 |
| | 0.37 | 1.48 | 97.9 | 2.1 | 5.4 | 4.1 | 88.4 | 1,250 |
| 1,500 | 0.25 | 8.4 | 99.9 | 0.1 | 18.1 | 9.5 | 72.3 | 1,220 |
| | 0.25 | 7.6 | 99.1 | 0.9 | 19.0 | 9.1 | 71.0 | 1,220 |
| 2,200 | 0.17 | 8.6 | 99.0 | 1.0 | 23.0 | 7.9 | 68.1 | 1,220 |
| | 0.17 | 0.75 | 72.0 | 28.0 | 13.3 | 1.3 | 57.4 | 980 |
| | 0.17 | 0.85 | 87.0 | 13.0 | 18.3 | 1.2 | 67.5 | 1,050 |
| | 0.17 | 1.25 | 98.5 | 1.5 | 20.0 | 2.3 | 76.2 | 1,160 |
| | 0.17 | 0.63 | 97.6 | 2.4 | 0 | 2.4 | 95.2 | 1,250 |
| | 0.17 | 7.6 | 99.1 | 0.9 | 22.6 | 7.5 | 69.0 | 1,220 |
| 3,000 | 0.12 | 0.66 | 59.2 | 40.8 | 12.1 | 1.5 | 45.6 | 980 |
| | 0.12 | 0.75 | 76.0 | 24.0 | 14.6 | 1.3 | 60.0 | 1,050 |
| | 0.12 | 0.76 | 93.5 | 6.5 | 24.9 | 1.3 | 67.3 | 1,160 |
| | 0.12 | 0.43 | 95.3 | 4.7 | 1.9 | 2.3 | 91.1 | 1,250 |
| | 0.12 | 12.2 | 91.3 | 8.7 | 20.1 | 0.8 | 72.4 | 1,200 |
| | 0.12 | 7.2 | 98.4 | 1.6 | 23.4 | 7.2 | 67.8 | 1,220 |
| 4,000 | 0.09 | 0.91 | 44.2 | 55.8 | 21.9 | 1.1 | 21.2 | 980 |
| | 0.09 | 0.64 | 67.3 | 32.7 | 14.0 | 0.8 | 52.5 | 1,050 |
| | 0.09 | 0.66 | 86.4 | 13.6 | 19.8 | 1.5 | 65.1 | 1,160 |
| | 0.09 | 0.24 | 90.0 | 10.0 | 11.7 | 2.1 | 76.2 | 1,250 |

As shown in the above Table there is a relationship existing between gas velocity through the reactor and the dwell time. In essentially all cases a dwell time greater than 5 minutes is not considered desirable. This is particularly noted when the concentration of dichlorosilane in the feed is relatively high, for example, as high as at least 3 mole percent. In the preferred practice of this invention it is desirable to operate the reaction such that the dwell time does not exceed about 3 minutes.

The residence or dwell times are calculated by dividing the volume of reactor 1 by the flow rate of the $H_2$ feed gas at normal temperature (25° C.) and normal pressure (1 atmosphere).

The ability to achieve the above advantages is not limited to the aforedefined reactor. Each reactor design will require a few experiments to ascertain conditions which provide such advantages. For example, certain reactors, such as the one depicted above, function suitably under laminar gas flow conditions. In such a reactor, localized eddies of turbulence are minimized with a consequent reduction in the number of times that by-product gas molecules, such as HCl and SiCl$_4$, are thrown into the hot substrate deposition surface. In the commercial bell jar type reactors, turbulent flow is almost impossible to avoid, and indeed, such turbulent flow has been considered desirable for such reactors. In such a reactor, the by-product gas molecules have optimum opportunity to be thrown into the substrate deposition surface. In a laminar flow reactor design, one can employ longer residence (dwell) times in the reactor and still achieve the aforementioned desirable results because there are less opportunities for by-product HCl and SiCl$_4$ to react with deposited silicon metal, whereas in a turbulent flow reactor, lower residence (dwell) times are preferred in order to prevent such by-product from overly reacting with deposited silicon metal.

As noted above, conditions can be employed which will not provide the advantages of this invention but those conditions are greatly dependent upon reactor design. No universal set of conditions govern this invention other than the knowledge that one should employ those conditions which experience dictates to achieve the incredible yields, productivity and efficiency of this invention. For example, in one reactor, low residence times may prove essential whereas in another, a longer residence time will provide most desirable results. A significant feature of this invention is that dichlorosilane operates in the conventional reactors for making silicon metal and one may obtain satisfactory results therewith employing conventional procedures. Only gross improper handling by the skilled worker and refusal to follow the teachings herein would preclude one from obtaining desirable results.

The ability to obtain epitaxial or single crystal silicon metal from dichlorosilane is simply controlled by the concentration of dichlorosilane in the reactor. Lesser concentrations of dichlorosilane, such as less than about 3 mole percent, in the aforementioned feed gases tend to enhance the formation of single crystal layers whereas higher concentrations favor polycrystalline silicon formation. However, one may achieve the same result by allowing only a small portion of the H$_2$SiCl$_2$ feed to decompose; such as by increasing the gas flow rate and consequently reducing the gas residence time in the reactor. Any of the conventional procedures employed for making single crystal silicon may be employed with the unique advantages described above.

Because of the ease of handling H$_2$SiCl$_2$, its manner of deposition, the uniform quality of the resulting Si metal product, the saving in recovery of by-products, the yields and the productivity of Si metal products, this invention represents a dynamic leap forward in the development of the silicon metal producing art.

Although this invention has been described with respect to a plurality of details thereof, it is not intended that such should act to limit the scope of this invention unless expressly set forth in the claims.

What is claimed is:

1. The process of producing semiconductor silicon metal from a chlorosilane whereby to obtain improved yields of silicon metal, based on the amount of silicon in the chlorosilane used to produce the silicon metal, which comprises providing dichlorosilane gas in admixture with hydrogen gas in a reaction zone having a temperature sufficient to effect reduction and decomposition of said dichlorosilane to silicon metal, but insufficient to soften the silicon metal, on a silicon deposition surface, and maintaining the temperature at which said reduction and decomposition is effected and the residence time of said dichlorosilane in said reaction zone sufficient to provide a by-product yield of SiCl$_4$ of less than 50 mole percent, based on the moles of dichlorosilane employed in making silicon metal, and also to provide a yield of silicon metal of at least 50 weight percent, based on the weight of silicon in the dichlorosilane starting material.

2. The process of claim 1 wherein the amount of dichlorosilane provided in the reaction zone is at least 5 mole percent of the gases in said zone.

3. The process of claim 2 wherein the dichlorosilane in said zone is at least 6 percent of the gases therein.

4. The process of claim 1 wherein the reaction zone is at a temperature of from about 800° C. to about 1300° C.

5. The process of claim 1 wherein the residence time of dichlorosilane in said reaction zone is less than about 5 minutes.

6. The process of claim 5 wherein said reaction zone is at a temperature of about 900° C. to about 1250° C.

7. The process of claim 1 wherein the residence time in the reaction zone is insufficient to produce an amount of SiCl$_4$ greater than 30 mole percent, based on the moles of Si in said dichlorosilane.

References Cited

UNITED STATES PATENTS

| | | | |
|---|---|---|---|
| 3,021,198 | 2/1962 | Rummel | 117—106 |
| 3,523,816 | 8/1970 | Caue | 117—106 |
| 3,745,043 | 7/1973 | Bradley | 117—201 |
| 3,023,087 | 2/1962 | Enk et al. | 423—349 |

FOREIGN PATENTS

| | | | |
|---|---|---|---|
| 671,446 | 10/1963 | Canada | 117—106 |

CHARLES E. VAN HORN, Primary Examiner

J. W. MASSIE, Assistant Examiner

U.S. Cl. X.R.

117—201; 423—350, 349